United States Patent
Han et al.

(10) Patent No.: US 9,225,029 B2
(45) Date of Patent: Dec. 29, 2015

(54) SYSTEM AND METHOD FOR THE RECOVERY OF FUEL CELL CATALYST PERFORMANCE

(75) Inventors: Taehee Han, Farmington Hills, MI (US); Nilesh Dale, Farmington Hills, MI (US); Kevork Adjemian, Birmingham, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 265 days.

(21) Appl. No.: 13/210,827

(22) Filed: Aug. 16, 2011

(65) Prior Publication Data

US 2013/0045431 A1 Feb. 21, 2013

(51) Int. Cl.
*H01M 8/04* (2006.01)
*H01M 8/18* (2006.01)
*H01M 8/00* (2006.01)

(52) U.S. Cl.
CPC .......... *H01M 8/04664* (2013.01); *H01M 8/008* (2013.01); *H01M 8/04* (2013.01); *H01M 8/18* (2013.01); *Y02E 60/50* (2013.01); *Y02W 30/86* (2015.05)

(58) Field of Classification Search
CPC .................................. H01M 8/04; H01M 8/18
USPC ........................................ 429/431; 180/65.21
See application file for complete search history.

(56) References Cited

U.S. PATENT DOCUMENTS

2003/0152816 A1* 8/2003 Hoch .............................. 429/13
2006/0219448 A1* 10/2006 Grieve et al. ................. 180/65.3
2010/0035098 A1 2/2010 Ramani et al.
2010/0173212 A1* 7/2010 Senoue et al. ................. 429/432
2010/0203407 A1* 8/2010 Iden et al. ...................... 429/429
2010/0227756 A1 9/2010 Kim et al.
2011/0008686 A1 1/2011 Gould et al.

FOREIGN PATENT DOCUMENTS

JP           2010-027298        2/2010
JP           2010027298 A       2/2010
WO       WO 2007088471 A1 *    8/2007

OTHER PUBLICATIONS

Shao et al. Nitrogen-doped carbon nanostructures and their composites as catalytic materials for proton exchange membrane fuel cell. Applied Catalysis B: Environmental, vol. 79, 2008, pp. 89-99 [online], [retrieved Aug. 29, 2013]. Retrieved from the Internet <URL: http://www.sciencedirect.com/science/article/pii/S0926337307003293>.*

(Continued)

*Primary Examiner* — Basia Ridley
*Assistant Examiner* — James Erwin
(74) *Attorney, Agent, or Firm* — Young Basile Hanlon & MacFarlane, P.C.

(57) ABSTRACT

Disclosed herein are systems and methods for recovering performance of fuel cells by recovering fuel cell catalyst activity. One system for recovering catalyst performance of a fuel cell stack made of one or more fuel cells in a vehicle comprises a sensor for detecting an EOL state of the fuel cell. A notification device notifies a user when the sensor detects the EOL state of the fuel cell. Means for drawing a steady-state load from the fuel cell stack is used to operate the fuel cell stack until the catalyst performance is recovered.

23 Claims, 11 Drawing Sheets (56) References Cited

OTHER PUBLICATIONS

Takeuchi, Norimitsu; Fuller, Thomas F., "Modeling and Investigation of Design Factors and Their Impact on Carbon Corrosion of PEMFC Electrodes", Journal of The Electrochemical Society, 155 (7) B770-B775 (2008) (6pp).

Urdampilleta, Idoia G.; Uribe, Francisco A.; Rockward, Tommy; Brosha, Eric L.; Pivovar, Bryan S.; Garzon, Fernando H.; "PEMFC Poisoning With H2S: Dependence on Operating Conditions", ECS Transactions, 11 (1) 831-842 (2007) (12 pp).

Gould et al., Operational performance recovery of SO2-contaminated proton exchange membrane fuel cells, J. Eiectrochem. Soc., 2010, 157, B1569-B1577.

Kothandaraman, Non-precious oxygen reduction catalysts prepared by high—pressure pyrolysis for low-temperature fuel cells, Appl. Catal. B: environmental, 2009, 209-216.

* cited by examiner

FIG. 14

SYSTEM AND METHOD FOR THE RECOVERY OF FUEL CELL CATALYST PERFORMANCE

BACKGROUND

Platinum and other precious metal-based catalysts have proven to provide superior performance to proton exchange membrane fuel cell technology. One of the major hurdles for mass-commercialization of proton exchange membrane fuel cell vehicles is their high cost. This is due, in particular, to the usage of platinum and other precious group metals as the electrocatalyst. Two potential strategies to reduce the cost are to either significantly lower the loading of platinum/precious group metals (PGM) or by using non-precious group metal (non-PGM) catalysts such as metal-nitrogen-carbon (MNC) type catalysts. So far, however, performance of non-PGM based electrocatalysts for the oxygen reduction reaction (ORR) in polymer electrolyte membrane fuel cells has been no match against the performance of PGM based catalysts, in part because they have a relatively low number of active sites per unit volume.

SUMMARY

Disclosed herein are processes for recovering performance of fuel cells by recovering fuel cell catalyst activity and methods of testing the durability and activity performance of fuel cells. One catalyst recovery process disclosed herein for a fuel cell having a membrane electrode assembly comprises operating the fuel cell for a first recovery cycle with fuel gas supplied to an anode of the fuel cell and an oxidant supplied to a cathode of the fuel cell while drawing a current from the fuel cell at steady state throughout the first recovery cycle, the first recovery cycle having a predetermined time period. The fuel cell has reached end of life due in part to intermittent use prior to operating the fuel cell for the first recovery cycle. A life of the fuel cell improves when the first recovery cycle is complete.

One method of testing durability of catalyst for use in a fuel cell having a membrane electrode assembly comprises performing start/stop cycling on a fuel cell at beginning of life until the fuel cell reaches end of life, supplying fuel gas to an anode of the fuel cell and an oxidant to a cathode of the fuel cell under steady state conditions for a predetermined period of time while drawing a current from the fuel cell, wherein the supplying improves the life of the fuel cell and testing the fuel cell to determine an amount of improvement in performance after the predetermine period of time lapses.

Also disclosed herein are systems for recovering catalyst performance of a fuel cell stack in a vehicle. One system for recovering catalyst performance of a fuel cell stack made of one or more fuel cells in a vehicle comprises a sensor for detecting an EOL state of the fuel cell. A notification device notifies a user when the sensor detects the EOL state of the fuel cell. Means for drawing a steady-state load from the fuel cell stack is used to operate the fuel cell stack until the catalyst performance is recovered.

Also disclosed herein are methods of recovering catalyst performance of a fuel cell in a vehicle. One such method comprises detecting a performance parameter of a fuel cell, notifying a user of the vehicle when the performance parameter is at or near end of life of the fuel cell and drawing a steady-state load from the fuel cell until the catalyst performance is recovered.

BRIEF DESCRIPTION OF THE DRAWINGS

The various features, advantages and other uses of the present apparatus will become more apparent by referring to the following detailed description and drawing in which.

DETAILED DESCRIPTION

Figure 1:
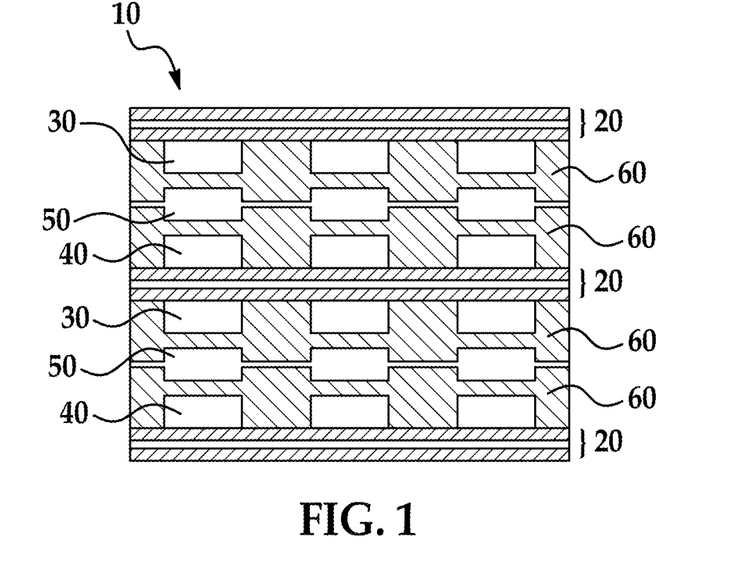
FIG. 1 is a schematic cross-sectional illustration of a basic fuel cell stack having multiple fuel cells.

FIG. 1 shows a schematic cross-sectional illustration of a portion of a fuel cell stack 10. The illustration is provided as an example of the fuel cell electrodes and is not meant to be limiting. The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Each fuel cell in the fuel cell stack 10 comprises a catalyst. Conventional PGM catalyst used in fuel cells is particles of an electrically conductive material, typically in powder form, which can comprise, for example, carbon as a support structure supporting a metal which is insoluble or only very slightly soluble in water with low oxidation sensitivity. Non-limiting examples of such a metal include titanium, gold, platinum, palladium, silver and nickel and mixtures thereof. The carbon support of the catalyst is electrically conductive and porous, so that sufficient conductivity and gas-permeability of the catalytic layer is ensured. Carbon minimizes electronic resistance of the electrode while the precious metal serves as the catalyst for the electrochemical reaction.

Figure 2:
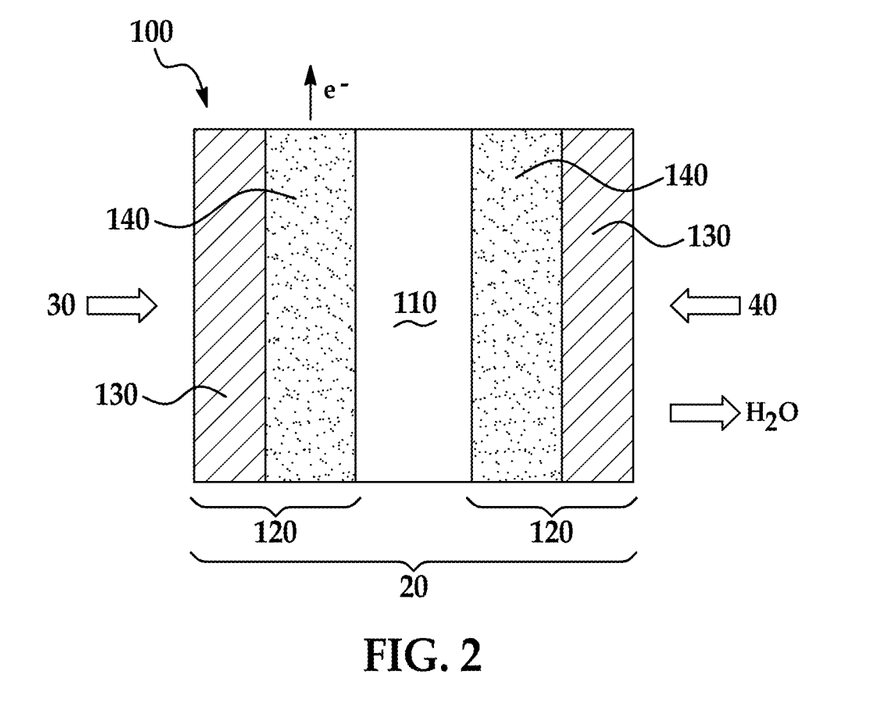
FIG. 2 is an enlarged schematic cross-sectional view of a membrane electrode assembly from the fuel cell stack of FIG. 1.

FIG. 2 is exemplary of one of the plurality of fuel cells 100 in the fuel cell stack 10. The fuel cell 100 can be comprised of a single membrane electrode assembly 20. The membrane electrode assembly 20 has an electrolyte membrane 110 with a gas diffusion electrode 120 on opposing sides of the membrane 110. Each gas diffusion electrode 120 has a gas diffusion layer 130 on which a catalyst layer 140 is formed. When fuel 30, such as hydrogen gas, is introduced into the fuel cell 100, the catalyst layer 140 of the gas diffusion electrode 120 splits hydrogen gas molecules into protons and electrons. The protons pass through the membrane 110 to react with the oxidant 40, such as air, forming water ($H_2O$). The electrons ($e^-$), which cannot pass through the membrane 110, must travel around it, thus creating the source of electrical energy.

To reduce the cost of fuel cells and to decrease environmental impact, much effort is being made to increase the performance and durability of non-PGM catalysts for use in fuel cells such as those described with reference to FIGS. 1 and 2, and in particular for fuel cells used in vehicles. With regard to performance, or activity, metal-nitrogen-carbon (MNC) type non-PGM catalysts have attracted attention due to their high ORR performance compared to other non-PGM catalysts. The MNC type catalysts are typically synthesized by heating precursors of nitrogen, carbon and metal. The metal can be, for example, iron and cobalt. It is believed that the nature of the catalytic active sites and mechanism of ORR at these sites for these MNC type catalysts strongly depends on the nitrogen and the metal precursor types, heat treatment temperature and carbon support morphology. It has also been demonstrated that increasing the nitrogen/carbon ratio of the nitrogen precursor increases the accessible active site density by reducing the carbon deposition in the pores of carbon support during pyrolysis.

In addition to performance, durability is also a great challenge for the non-PGM catalysts, including those non-PGM catalysts performing under proton exchange membrane fuel cell operating conditions. Load cycling and start-stop cycling are two critical durability tests to identify the stability of a catalyst for proton exchange membrane fuel cells.

Load cycling for a PGM cathode catalyst is typically conducted at a relatively low potential range (0.6-0.95 V) to simulate the normal fuel cell operating voltage range. This load cycling results in PGM catalyst degradation due to platinum (or other precious metal group) dissolution and migration. This PGM catalyst degradation can be mainly ascribed to (i) precious metal dissolution and redeposition (Oswald reopening process) and (ii) precious metal agglomeration due to precious metal nanocrystallite migration and/or loss of support. Due to the absence of precious metal groups in the non-PGM catalysts, the effect from the load cycling on the non-PGM catalyst is minimal.

Generally, a fuel cell catalyst's in-situ performance and durability can be evaluated by its iV (current and voltage) characteristics under various operating conditions and potential cycling tests under accelerated operating conditions. One of the important catalyst durability tests is the start-stop (carbon corrosion) test. It evaluates the stability of carbon support for a fuel cell catalyst during potential cycling. This accelerated durability protocol simulates the repeated start-up and shut down of a fuel cell stack in actual operation without the application of any operational controls that may mitigate the losses. This durability protocol can be applied to both PGM and non-PGM fuel cell catalyst having carbon support.

Non-PGM catalyst, however, is more severely deteriorated than PGM catalyst by the start-stop cycling of the fuel cell in which it operates. This is because the majority of the non-PGM catalyst is carbon. This start/stop cycling is particularly prominent when the fuel cell is used to power a vehicle. However, the start/stop cycling can occur in any appliance or device powered by a fuel cell where starting and stopping of the device occurs frequently throughout the life of the fuel cell.

Start/stop cycling can be simulated by simulating in rapid succession load variations including load cessation and bringing load from cessation to an operating load with such frequency to simulate the operating, starting and stopping over a lifetime of use of the fuel cell, such as would be experienced by a fuel cell used in a vehicle, also described as intermittent use. During the start-stop cycling, degradation of the catalyst occurs due to corrosion of the carbon in the catalyst. Surface oxides form on the surface of the carbon, forming a passive layer on the catalyst surface. This surface oxide decreases the performance of the catalyst and therefore the fuel cell. Complete oxidation of carbon is also possible which results in permanent loss of carbon from the non-PGM catalyst.

To compromise for the lower activity per volume of non-PGM catalyst, non-PGM catalyst layers should be around 10 times thicker (~100 μm) than PGM catalyst layers (~10 μm). Therefore, an attempt was made to electrochemically remove the surface oxides formed during the start-stop cycling durability testing to regenerate the catalyst surface with an expectation of partial or full recovery of performance of the non-PGM catalyst.

The recovery process disclosed herein regenerates a catalyst used in fuel cells after the performance has been degraded due to load and/or start-stop cycling. The recovery process can be performed on either PGM or non-PGM catalysts. The disclosure concentrates on non-PGM catalysts due to the increased thickness and therefore a larger amount of carbon.

A fuel cell prior to any use has beginning of life (BOL) characteristics. As used herein, "BOL" means the performance potential of the fuel cell prior to any use. BOL can be measured using one or more characteristics such as voltage and current. BOL can be measured using other characteristics depending on the application of the fuel cell. For example, BOL for a fuel cell that powers a motor vehicle may be measured by length of time of operation or distance traveled, such as 0 hours operated or 0 miles travelled. The recovery process regenerates performance in, for example, the non-PGM MNC type catalyst used in fuel cell membrane electrode assemblies after carbon corrosion cycling, when the fuel cell is at end of life (EOL) or has EOL characteristics. As used herein, "EOL" means the point at which the fuel cell is not producing sufficient power to fully operate the device in which it is located. EOL can be measured using one or more characteristics such as voltage and current, or iV (current-voltage measuring system). EOL can be measured using other characteristics depending on the application of the fuel cell. For example, EOL of a fuel cell that powers a motor vehicle may be measured by length of time of operation or distance traveled. The recovery process regenerates the catalyst, bringing the fuel cell from EOL to at or near its BOL performance characteristics after one completion of the recovery process. The catalyst can be regenerated fully to its BOL performance typically after a first recovery process cycle. It is also possible to regenerate catalyst so that a fuel cell's performance potential is greater than its initial BOL if the recovery process is performed in conjunction with preconditioning of the fuel cell. Fuel cells undergo a preconditioning process prior to installation for use. Performing the preconditioning process after the recovery process can further increase the fuel cell's BOL performance characteristics.

Figure 3:
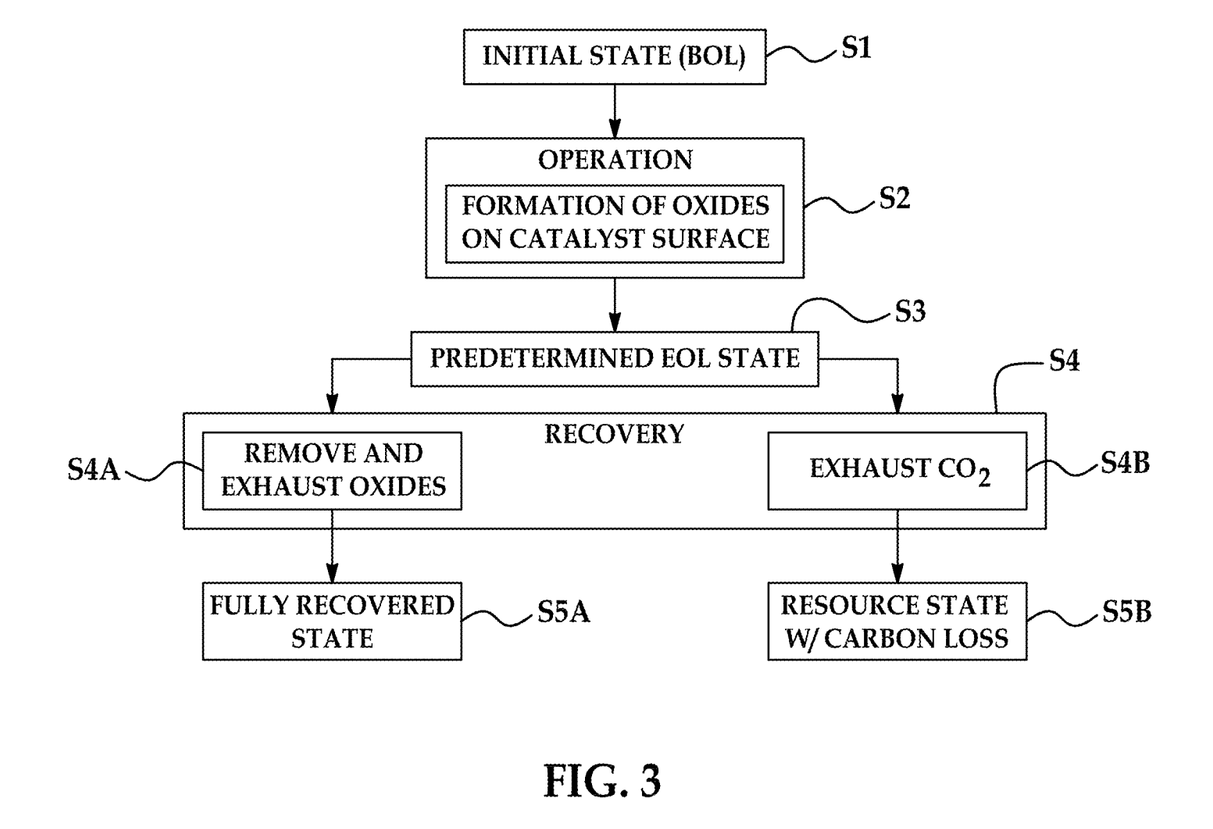
FIG. 3 is a flow diagram of the recovery process.

Referring to FIG. 3, the fuel cell is at an initial state equal to BOL prior to any use (S1). During operation of the fuel cell, the catalyst is degraded (S2) until it reaches a predetermined EOL state (S3). After the fuel cell catalyst has been degraded, the recovery process (S4) is performed on the fuel cell by operating the fuel cell at steady state, supplying hydrogen to the anode and the oxidant to the cathode, while a steady current is being drawn from the fuel cell over a predetermined amount of time. The current drawn can be between about 0.3 A/cm$^2$ to about 0.5 A/cm$^2$. Higher current than 0.5 A/cm$^2$ can be drawn from the fuel cell if applicable. The hydrogen and oxidant flow rates can be those used in operation of the fuel cell. For example, the hydrogen flow rate can be about 0.5 nlpm. The hydrogen flow rate can be lower than 0.5 nlpm and the oxidant flow rate can be increased while achieving similar recovery in iV performance. It should be noted that the proper flow rates can vary depending on the geometry of the flow field of the fuel cell.

When referring to regeneration or recovery, it is understood that the catalyst undergoes the electrochemical change while the fuel cell, including the membrane electrode assembly and gas diffusion electrode, or the membrane electrode assembly or gas diffusion electrode alone, recovers performance due to the electrochemical change that the catalyst undergoes during the recovery process.

The pre determined amount of time is based on testing and is the time required to regenerate a predetermined EOL state to at or near the initial state. The initial state before the first recovery is performed is the BOL of the fuel cell prior to use. The initial state for subsequent recovery processes is the state to which the fuel cell is recovered after the previous recovery process. The predetermined amount of time is approximately between 15 to 20 hours. The recovery process can be longer or shorter than the 15 to 20 hour range depending on the type of carbon support and catalyst. As a non-limiting example, graphitized carbon support may require an adjustment in predetermined time. The recovery of PGM catalysts may also require an adjustment in the predetermined time to achieve the desired results. The length of time elapsed between EOL of the fuel cell and the start of the recovery process may affect the predetermined amount of time necessary for the recovery process to achieve the desired results.

The process can be done at ambient pressure. However, the pressure can be higher than ambient pressure, such as 100 kPA_g, thereby reducing the predetermined amount of time necessary to achieve the desired results. For example, performing the process at ambient pressure requires between 15 and 20 hours. Performing the process at a pressure of about 1 to 5 bars can reduce the period necessary to achieve recovery to less than 15 to 20 hours. It should be noted that the pressure will also vary depending on the geometry of the flow field of the fuel cell, which will also affect the necessary time required for recovery.

The oxidant can be oxygen or air, with the use of air resulting in a longer predetermined amount of time necessary to achieve the desired results. Air can be used during the recovery process if the membrane electrode assembly undergoing recovery does not have mass transport limitations and at least 0.3 A/cm$^2$ current can be drawn from the fuel cell.

This recovery operation causes reactions with the surface oxides on the carbon, allowing the surface oxides to be removed from the surface of the catalyst (S4A) resulting in a fully recovered state (S5A). Carbon dioxide can also be exhausted (S4B), resulting in a fully recovered state with carbon loss (S5B). As mentioned, the resulting condition of the fuel cell can be equal to or near the initial condition of the fuel cell before undergoing the recovery process.

Figure 9A:
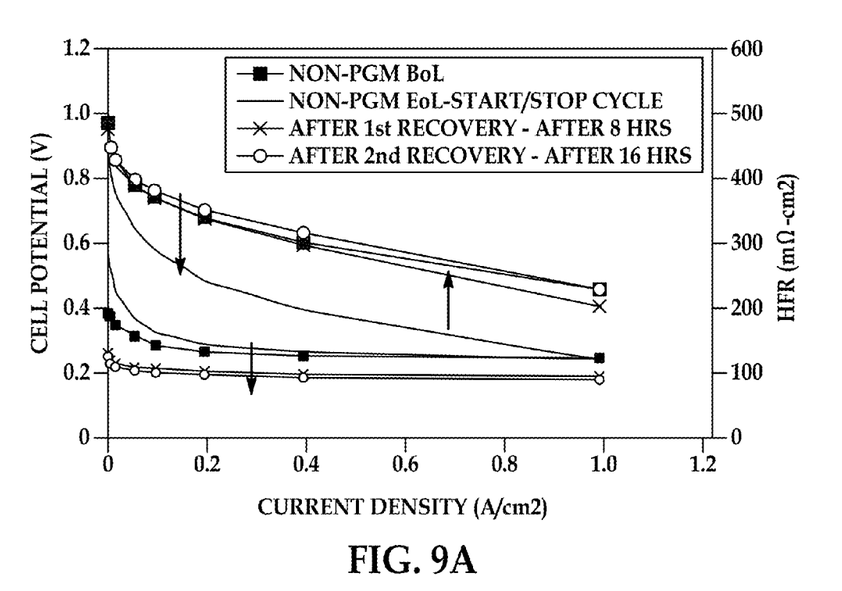
FIG. 9A is a graph showing the effect of start-stop cycling and the recovery processes on iV performance ($H_2/O_2$ fully humidified at 80° C. and 100 kPa_g)

The results of the recovery process may be explained by the electrochemical oxidation processes. During the carbon corrosion durability test, the cell potential is cycled in protocol for the certain number of cycles, for example, 1000 cycles to simulate long term intermittent operation of the device. During this high potential cycling, the carbon surface electrochemically oxidizes to form surface oxides (oxygen containing groups such as carboxyl, carbonyl, phenol, carbonyl etc.) and gaseous carbon dioxide by partial (or incomplete) and complete oxidation pathways, respectively. Generally, at the beginning, incomplete oxidation (formation of surface groups) is dominant over complete oxidation (formation of carbon dioxide, which results in the complete loss of carbon support.) Oxides are generally surface bound so they form a layer on the carbon surface. These surface oxides make the carbon support more hydrophilic so that the catalyst retains more water during fuel cell operation and introduces significant mass transport losses. The passive oxide layer on the catalyst surface also negatively affects the activity of the non-PGM catalyst. The fuel cell iV performance drops significantly due to the formation of these surface oxides as shown in FIG. 9A.

Figure 4:
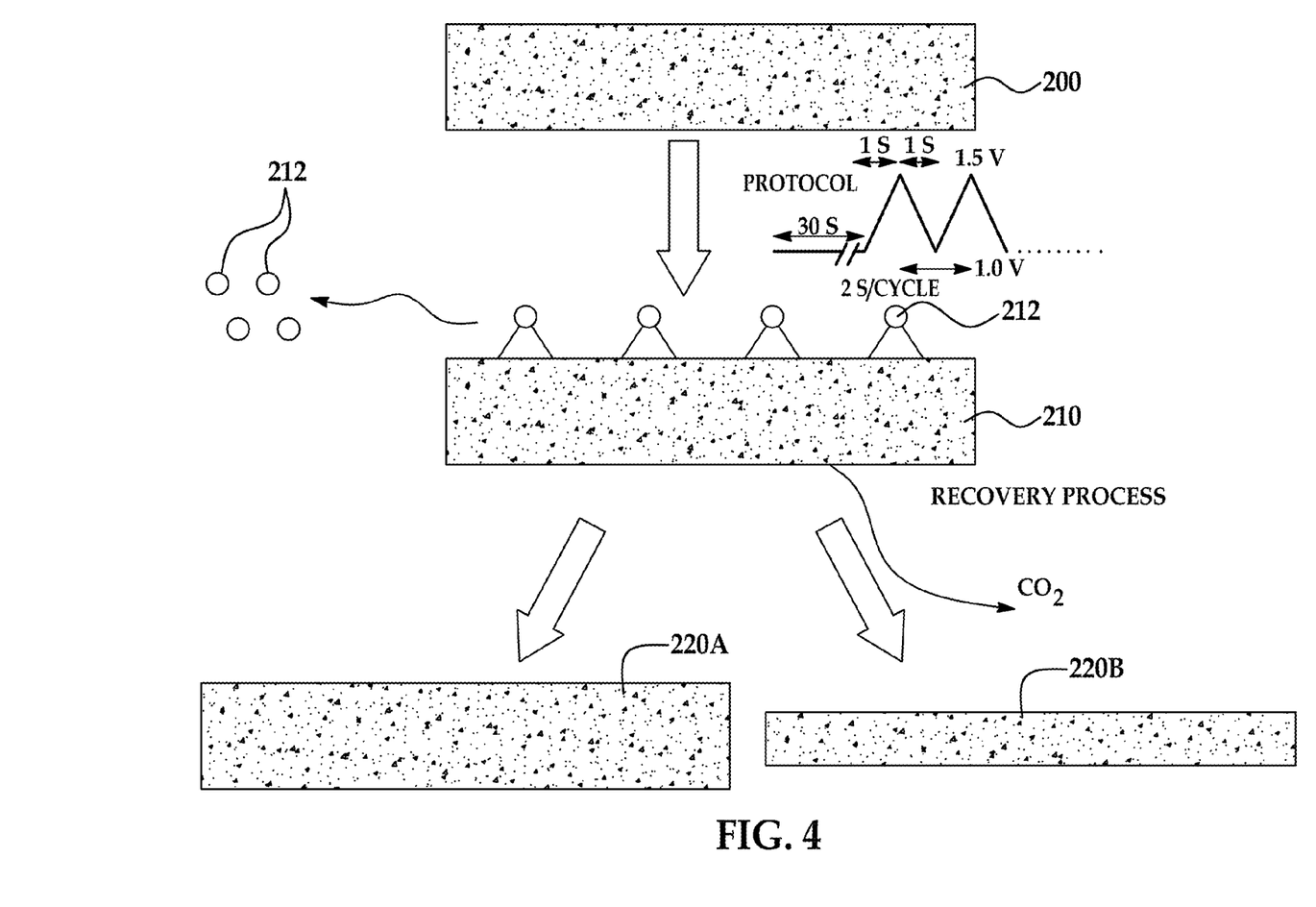
FIG. 4 is a schematic of the recovery process.

During this recovery process, the created surface oxides on the catalyst surface are removed. The mechanism for surface oxide removal is one or a combination of the complete oxidization of the surface oxide to carbon dioxide and the reduction of the oxide back to the original catalyst structure. In this process, the electrocatalyst loses some of the carbon support; however, even with some carbon loss, the non-PGM catalyst maintains enough carbon to provide adequate electrochemical activity and electronic conductivity. A schematic of this process is shown in FIG. 4. The non-PGM catalyst 200 is shown at BOL prior to any use. The non-PGM catalyst 210 is shown with surface oxides 212 after the fuel cell has been in use. The non-PGM catalyst 220A and B represents non-PGM catalyst 210 after it has undergone the recovery process. As shown, the surface oxides 212 are removed from the carbon in the catalyst 220A. Some of the carbon of the non-PGM catalyst 210 may form carbon dioxide ($CO_2$) and be exhausted from the fuel cell during the recovery process, thus reducing the amount of carbon remaining in the non-PGM catalyst 220B.

Figure 5:
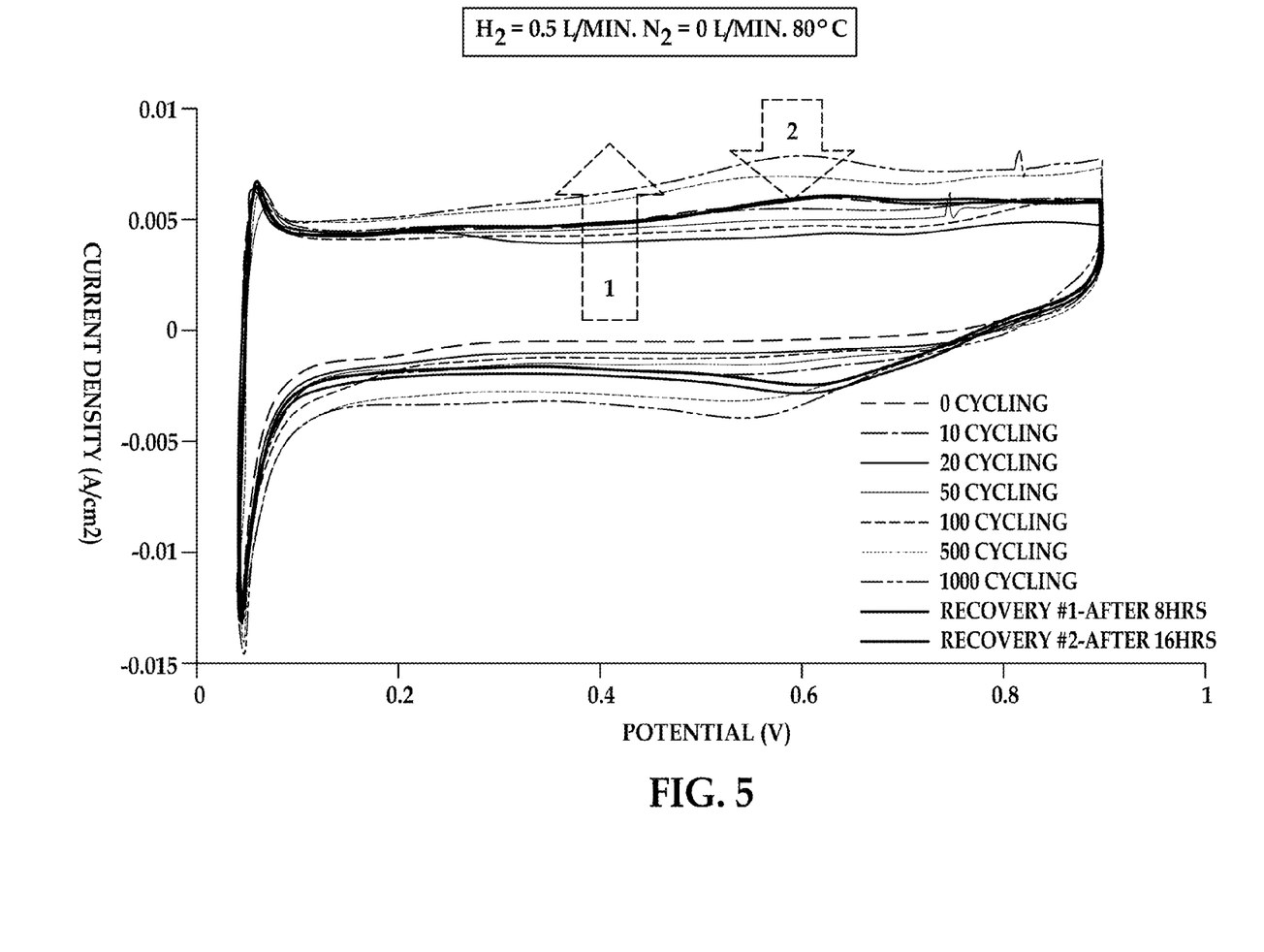
FIG. 5 is a fuel cell cyclic voltammetry plot before and after carbon corrosion and the recovery process.

Cyclic voltammetry (CV) was performed during the carbon corrosion durability test and before and after the recovery process to verify the formation and removal of surface oxide as shown in FIG. 5. Formation of surface oxides due to the potential cycling during the carbon corrosion test resulted in increased carbon current and peak appearance at/around 0.6 V as shown in FIG. 5. CV was also measured after each recovery cycle. Reduced carbon current and peak shrinkage at/around 0.6 V after each recovery step confirm the removal of surface oxides.

After a certain number of cycles in which the recovery process is performed, depending on the type of carbon support, eventually the electrocatalyst will lose enough carbon that it can not support the required electronic conductivity for fuel cell operation. At this point, the recovery process may no longer recover the iV performance of fuel cell catalyst.

The recovery process disclosed herein when used on non-PGM fuel cell electrocatalyst regenerates catalyst when the fuel cell is at its EOL back to its BOL characteristics, potentially doubling the fuel cell's life. After the recovery process, the recovery in performance is not only observed in the mass transport region but in the kinetic region as well. Subsequent recovery process cycles can be performed on the fuel cell each time the fuel cell reaches the predetermined EOL state. As additional recovery process cycles are performed, the percent recovery of BOL characteristics decreases. The limiting factor of number of recovery process cycles is the amount of carbon loss, as at a certain amount of carbon loss, the catalyst cannot maintain sufficient electronic conductivity during fuel cell operation.

The recovery process can be done on fuel cells with non-PGM catalyst as a "pre-treatment" prior to first use in operation. It has been seen that the recovery process can actually improve on the BOL characteristics of the fuel cell, thereby enhancing the life cycle of the fuel cell even before it is in use. The recovery process can also be used to partially recover BOL characteristics of fuel cells using PGM catalyst, and in particular, platinum and platinum-alloy catalysts with various types of carbon supports. It is contemplated that the recovery process may be used to remove contamination such as hydrogen sulfide poisoning.

The recovery process is useful in the testing environment as well. The recovery process can be used, for example, to evaluate the durability of the various carbon supports that can be used in both PGM and non-PGM catalysts as further potential cycling can be performed after the recovery process has been done.

To illustrate in detail the recovery process, the following example is provided. A metal-nitrogen-carbon type non-PGM catalyst was produced using a melamine precursor and a high surface area carbon with optimized surface nitrogen content. Ketjenblack 600JD was dispersed in a 95% ethanol solution, to which iron (II) acetate corresponding to 0.75 wt % Fe was added. This slurry was stirred for six hours followed by solvent evaporation to get a dry powder. Powder samples were then ground with pyridinic nitrogen rich precursor melamine (N/C=2.0) to achieve nominal 6.3 wt % N loading. After the post synthesized treatment, the catalyst powder was used to prepare a catalyst ink by mixing with water, ethanol and 20 wt % Nafion solution.

Gas diffusion electrodes (GDEs) with 0.56 $mg_{cat}/cm^2$ (4 $mg_{total}/cm^2$) loadings were prepared by spraying the catalyst ink onto a SGL SIGRACET® 25 BCH gas diffusion layer (GDL). Due to the thick catalyst layer, GDEs were pre-pressed at room temperature to avoid any shorting during the hot-pressing due to having a thick and rough catalyst layer surface. Membrane electrode assemblies (MEAs) were prepared by hot-pressing a traditional 0.4 $mg_{Pt}/cm^2$ loading Pt/C GDE as the anode, a catalyst coated GDE as the cathode and DuPont™ Nafion® NRE211CS as the membrane. Prepared MEAs were evaluated in a 25 $cm^2$ single cell with serpentine flow fields. Initial conditioning was performed under fully humidified $H_2$/Air, 0.5 A/$cm^2$, 80° C. and ambient pressure for 16 hours. After initial conditioning and BOL iV performance measurements, the MEA was subjected to a load cycling durability test for 10,000 cycles (protocol: 0.6-0.95 V) and a start-stop (carbon corrosion) durability test for 1,000 cycles (protocol: 1 V-1.5 V). Open circuit potential (OCV) and cyclic voltammograms (CVs) were measured periodically during the cycling. EOL iV performance was measured at the end of these durability cycling tests. The accelerated durability protocol used simulates start-up and shut-down of a fuel cell stack as used in a motor vehicle without the application of any operational controls that may mitigate losses. During start up, if the fuel cell stack has been shut down long, the anode and the cathode are filled with ambient air and pinned to air-air potential. Turning on the hydrogen flow causes a hydrogen-air front to move through the anode chamber causing the highest potential of 1.5 V. Thus, in the absence of any mitigating procedure, the cell potential cycles from about 1 V to 1.5 V. During this excursion, the carbon in the cathode corrodes and results in degradation of the catalyst layer.

The recovery process was carried out after the initial 1,000 start-stop durability protocol cycles. During this recovery process, 0.3 to 0.5 A/$cm^2$ current was drawn from the fuel cell for 16 hours in two steps while supplying fully humidified hydrogen and oxygen at 80° C. under ambient pressure. The reason for using oxygen instead of air for recovery conditioning is that fuel cell could not be operated at high enough steady state current density (~0.5 A/$cm^2$) using air due to the catalyst degradation during start-stop cycling. OCV, iV performance and CVs were measured after each recovery step. Based on the results for this recovery process, an additional 600 start-stop cycles were carried out in two steps of 300 cycles and similar recovery steps were carried out at the end of these additional potential cycling steps. OCV, iV performance and CVs were measured after these additional potential cycling steps and after the recovery steps to monitor any recovery in iV performance.

Figure 6A:
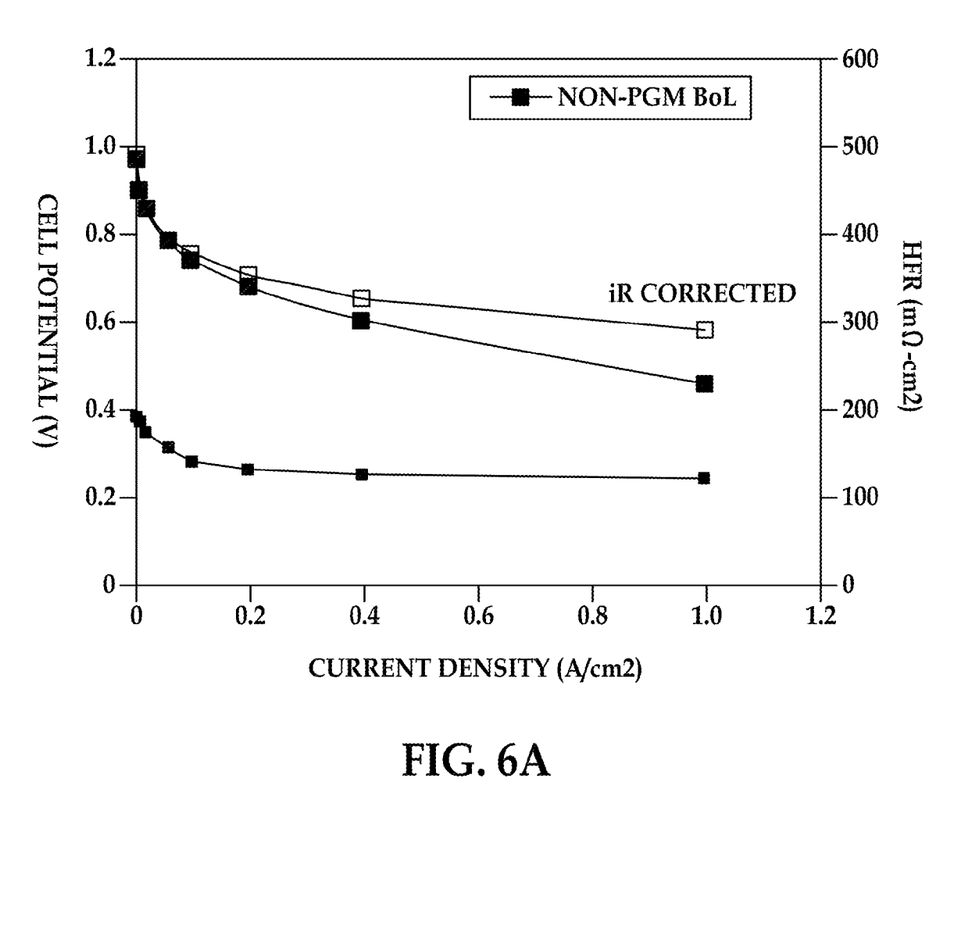
FIG. 6A is a graph showing BOL iV performance measured at one bar pressure with and without iR correction data.
Figure 6B:
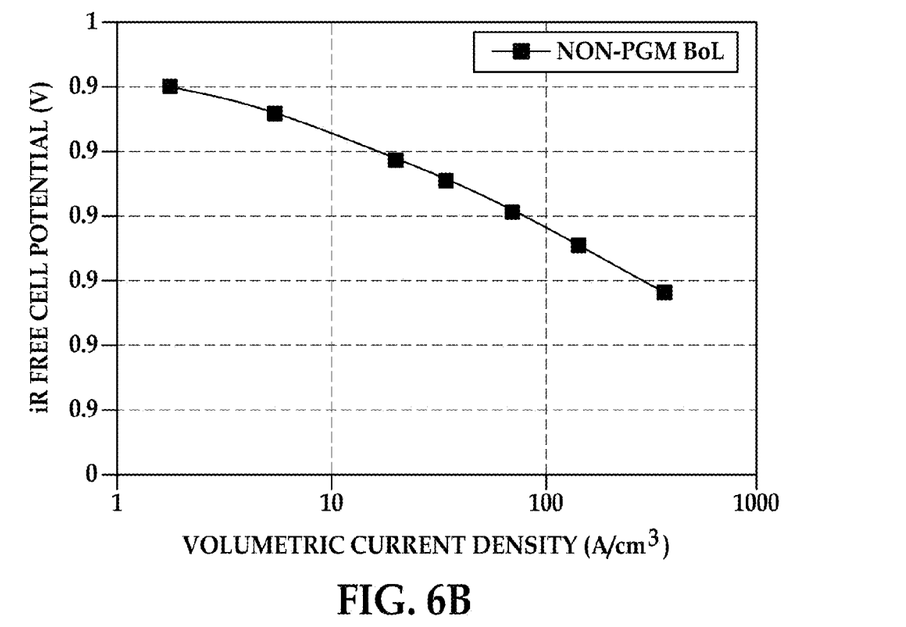
FIG. 6B is a graph showing volumetric activity or volumetric current density.

With regard to the BOL evaluation of the MEA, FIG. 6A shows BOL iV performance measured at one bar pressure with and without iR correction data. iR correction for non-PGM cathode catalyst MEA becomes important due to very high amount of ionomer in the catalyst layer and the catalyst layer thickness which result in higher high frequency resistance values. High OCV of ~0.97 V was observed for this catalyst under fully humidified $H_2/O_2$ 0.42/0.84 nlpm at 1 bar_g. Current densities around 750 mA/$cm^2$ at 0.6 $V_{iR-free}$/RHE were obtained in comparison with 50-700 mA/$cm^2$ reported for similar MNC catalysts. Due to the high resistance, iR corrected data shows a significant improvement in iV performance. Volumetric activity or volumetric current density is shown in FIG. 6B and is calculated at 0.8 $V_{iR-free}$ voltage without any extrapolation of data in kinetic region and assuming an effective carbon density of 0.4 g/$cm^3$. Volumetric current density of 31 A/$cm^3$ was obtained for this melamine based catalyst MEA with a back-pressure of 1 bar.

Figure 7A:
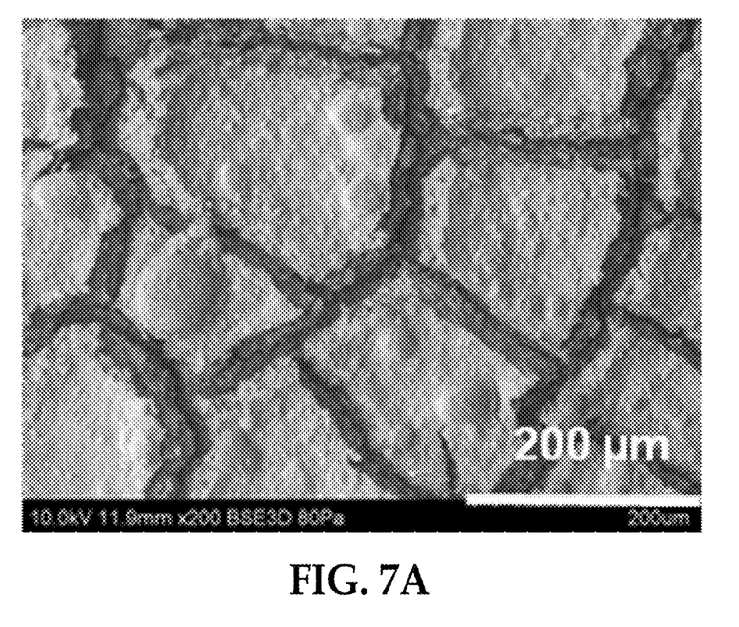
FIG. 7A is an SEM image of a metal-nitrogen-carbon catalyst based GDE showing surface morphology at 200×.
Figure 7B:
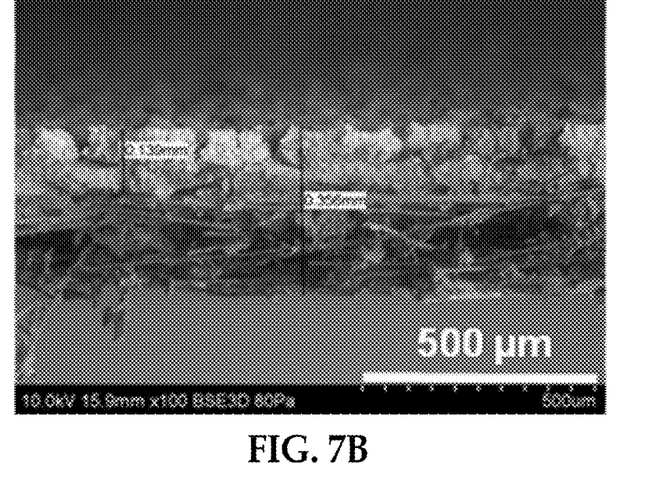
FIG. 7B is an SEM cryofractured cross-sectional view of the metal-nitrogen-carbon catalyst based GDE at 100×.

FIG. 7A is an SEM image of a metal-nitrogen-carbon catalyst based GDE of its surface morphology at 200×. FIG. 7B shows an SEM cryofractured cross-sectional view of the metal-nitrogen-carbon catalyst based GDE at 100×. The catalyst layer thickness of ~139 μm was observed compared to a typical thickness of ~10 μm for a platinum based catalyst layer. A thick catalyst layer is a result of the higher catalyst loading requirements for these non-PGM catalysts and higher ionomer contents.

Figure 8A:
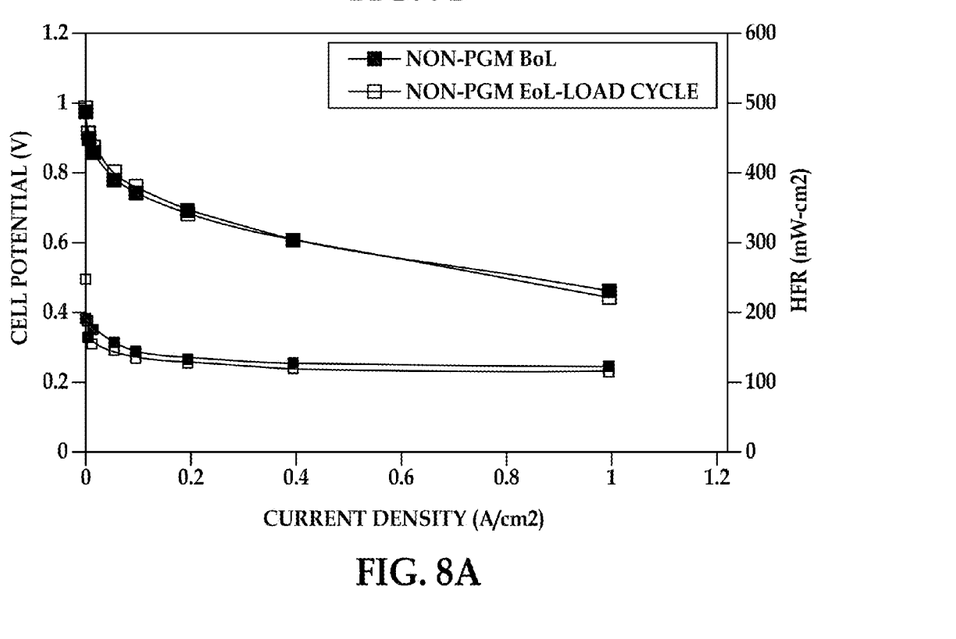
FIG. 8A is a graph showing the effect of load cycling only on iV performance ($H_2/O_2$ fully humidified at 80° C. and 100 kPa_g)
Figure 8B:
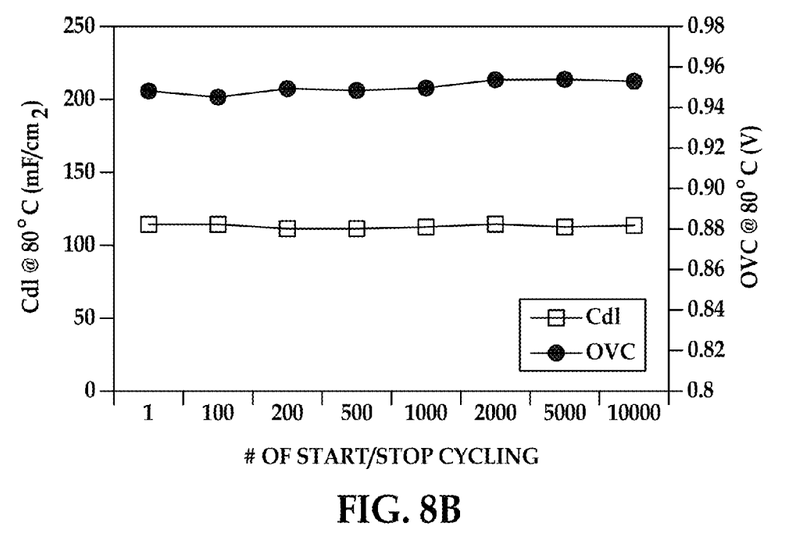
FIG. 8B is a graph showing the double layer capacitance ($C_{dl}$) or OCV ($H_2/O_2$ 0.5 nlpm for both anode and cathode under atmospheric pressure) values.

FIG. 8A shows the effect of load cycling only on iV performance ($H_2/O_2$ fully humidified at 80° C. and 100 kPa_g). No significant change in iV performance was observed after standard load cycling (BoL vs. EoL) for 10,000 cycles. This shows very positive durability results for non-PGM catalysts under this accelerated standard load test. This high durability can also been demonstrated with no observable change in a double layer capacitance ($C_{dl}$) or OCV ($H_2/O_2$ 0.5 nlpm for both anode and cathode under atmospheric pressure) values as shown in FIG. 8B.

FIG. 9A shows the effect of start-stop cycling and the recovery processes on iV performance ($H_2/O_2$ fully humidified at 80° C. and 100 kPa_g). A significant drop in iV performance was observed after standard start-stop cycling (BoL vs. EoL) for 1,000 cycles due to the formation of surface oxides (oxygen containing groups such as carboxyl, carbonyl, phenol, carbonyl etc.) and carbon loss. These surface oxides typically make the carbon support more hydrophilic thereby retaining more water in the catalyst layer during fuel cell operation which introduces significant mass transport losses. A passive oxide layer on catalyst surface is also believed to negatively affect the activity of the non-PGM catalyst. Surface oxide formations due to the potential cycling also resulted in an increased $C_{dl}$ and decreased OCV values ($H_2/O_2$ 0.5 nlpm for both anode and cathode under atmospheric pressure) as shown in FIG. 9B.

Figure 9B:
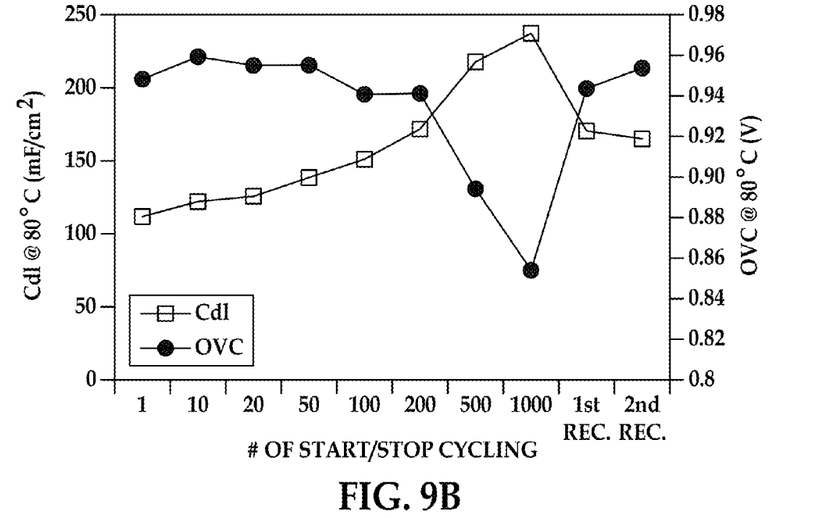
FIG. 9B is a graph depicting $C_{dl}$ and OCV values ($H_2/O_2$ 0.5 nlpm for both anode and cathode under atmospheric pressure)

However, an increase or "recovery" in the performance was observed after both recovery steps (After $1^{st}$ Recovery & After $2^{nd}$ Recovery) as shown in FIGS. 9A and 9B. After the first recovery cycle, significant improvement in iV performance was observed and after the second recovery cycle, iV performance was very close to BOL performance as can be seen in FIG. 9A. During this recovery process, the created surface oxides on the catalyst surface are removed. The mechanism for surface oxide removal is some combination of the complete oxidization of the surface oxide to carbon dioxide and the reduction back to the original catalyst structure or a modified version of the structure. This recovery in performance can also be observed with an increase of OCV after the recovery steps and a lowering of $C_{dl}$ as shown in FIG. 9B. Increase in $C_{dl}$ with start-stop cycling can be attributed to formation of the surface oxides, and drop in $C_{dl}$ values after recovery steps indicates the removal of these surface oxides.

During this recovery process, the catalyst may lose some of the carbon support; however even with some carbon loss, this non-PGM catalyst maintains enough carbon to provide adequate electrochemical activity and electronic conductivity. It should be pointed out that the role of the carbon support for non-PGM catalysts is not only for the support/electronic conduction but also as the key player in the electrochemical reaction pathway. Therefore, if enough durability cycles are performed, recovery will no longer be possible.

Figure 10:
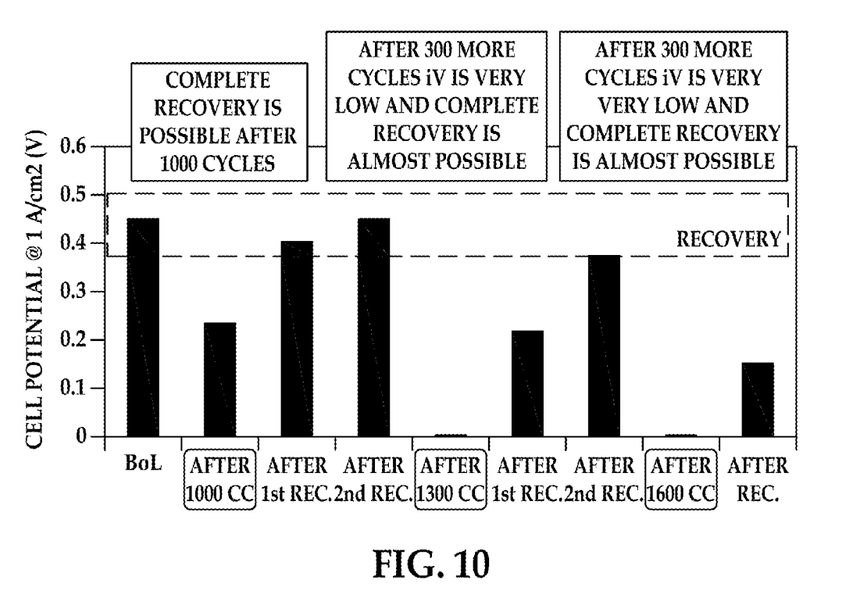
FIG. 10 is a graph showing the effect of the start-stop cycling and the recovery process on the cell potential at 1 $A/cm^2$.

After performing standard start-stop cycling protocol (up to 1,000 potential cycling), an additional 600 cycles were performed in 300 cycle increments to verify the further recovery of the tested MEA. FIG. 10 shows the effect of the start-stop cycling and the recovery process on the cell potential at 1 A/cm². As shown in FIG. 10, after completion of accumulated 1,300 cycles, the iV performance of MEA dropped significantly and could not sustain 1 A/cm². However, as previously seen, MEA performance was able to recover nearly completely after a recovery process performed for sixteen hours.

An additional 300 start-stop cycles were performed and iV performance was measured after the total 1600 cycles. As expected, a significant drop in iV performance was observed. Again the recovery process was carried out to verify any recovery in iV performance. However, after 1600 start-stop cycles, the MEA may have reached the "not recoverable point" and significant recovery was not observed. This is the point where there might not be enough active carbon left in order to be an effective ORR catalyst.

The catalyst recovery processes disclosed herein can be performed on a fuel cell stack in a vehicle without removing or disassembling the fuel cell stack. A vehicle built to be powered by a fuel cell will have the necessary equipment to run the recovery process on an as needed basis. Thus, upon detection of a degraded state or end of life, the vehicle can undergo the recovery process to recover the performance of the fuel cell to at or near beginning of life performance. The system for catalyst recovery of a fuel cell can be installed at a vehicle owner's residence. Alternatively, the owner could approach a dealer or mechanic after being informed of the degraded state or end of life, to have the recovery process performed at the dealer or mechanic's facility, much like one would currently do for an oil change of an internal combustion engine vehicle.

Figure 11:
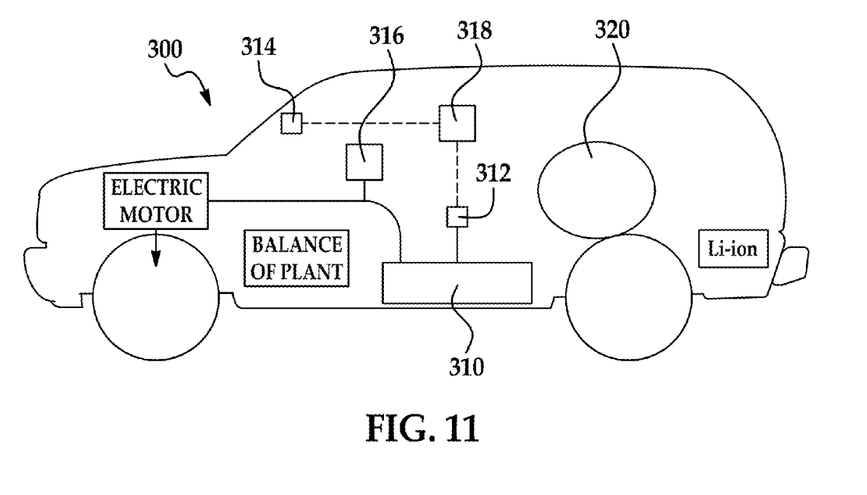
FIG. 11 is a schematic of a recovery process system.
Figure 12:
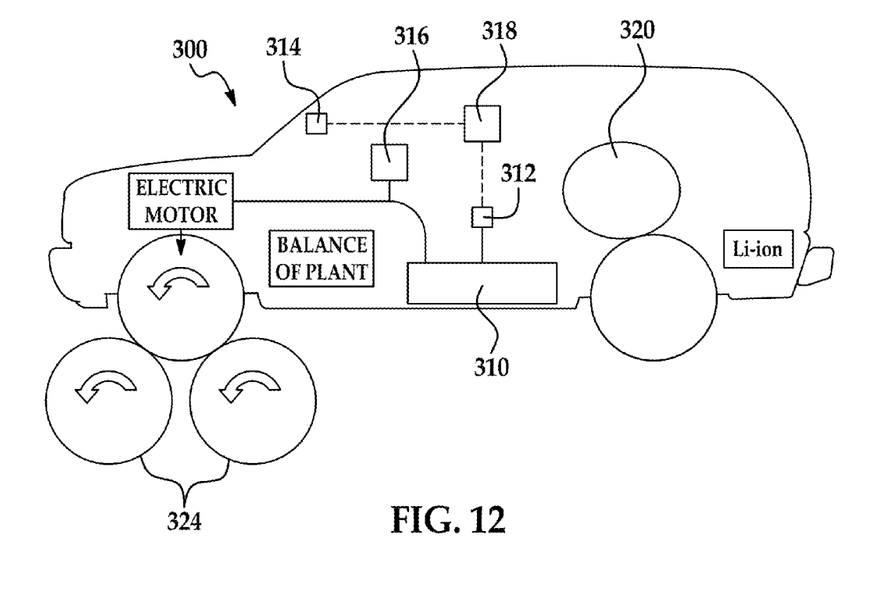
FIG. 12 is a schematic of another embodiment of a recovery process system.
Figure 13:
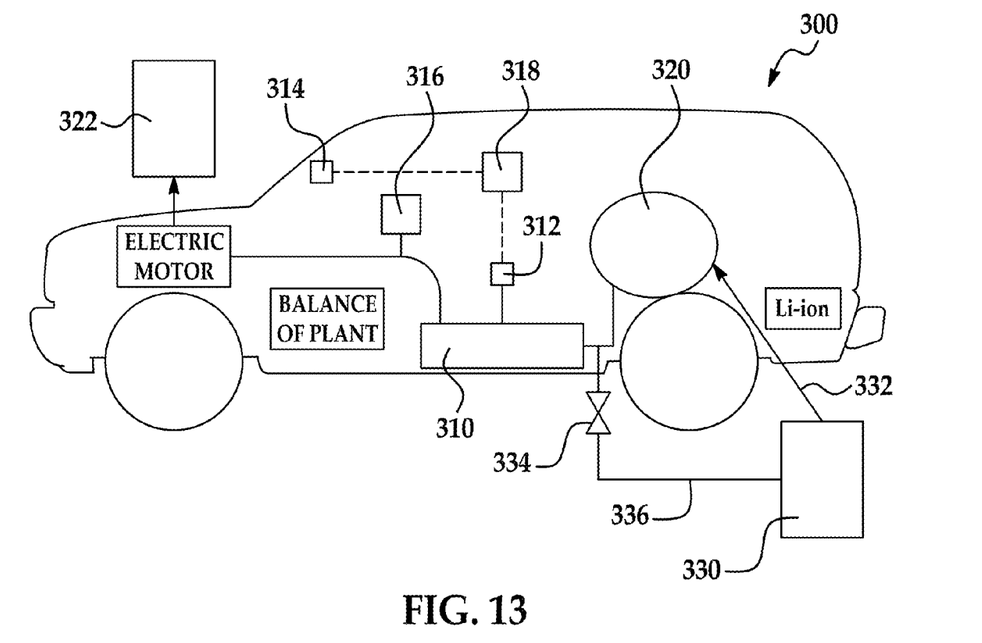
FIG. 13 is a schematic of another embodiment of a recovery process system.

Referring to FIGS. 11-13, in one system for recovering catalyst performance of a fuel cell stack 310 comprising one or more fuel cells in a vehicle 300 disclosed herein, the system comprises a sensor 312 for detecting EOL of the fuel cell. A notification device 314 notifies a user when the sensor detects EOL of the fuel cell. Means for drawing a steady-state load 316 from the fuel cell stack 310 is used to operate the fuel cell stack 310 until the catalyst performance is recovered.

Figure 14:
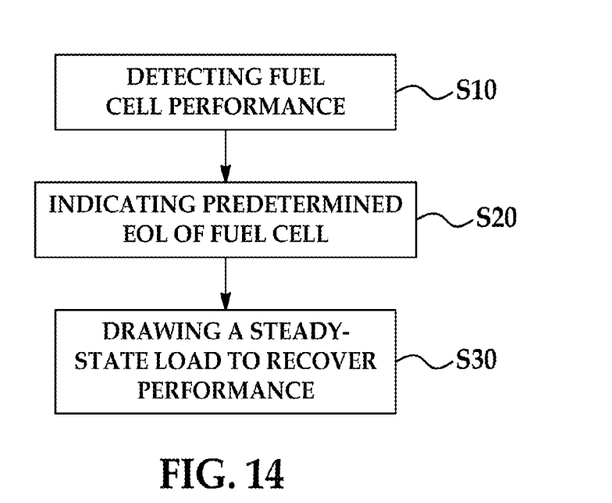
FIG. 14 is a flow diagram of a method of operating a recovery process system.

Also disclosed herein are methods of recovering catalyst performance of a fuel cell in a vehicle. Referring to FIG. 14, one such method comprises detecting a performance parameter of a fuel cell S10, notifying a user of the vehicle when the performance parameter is at or near end of life of the fuel cell S20 and drawing a steady-state load from the fuel cell until the catalyst performance is recovered S30.

The sensor 312 can be located anywhere in the vehicle 300 where it can detect the necessary parameters that will indicate EOL. As defined herein, EOL can be measured with many different parameters, including current, voltage, hours of operation, amount of miles driven, and the like. The sensor 312 can be of any type known to those skilled in the art that is configured to detect the EOL parameters.

The sensor 312 can operate to continuously monitor the EOL parameter while the vehicle 300 is in operation. A controller 318 can be included in the vehicle 300 and can collect the data detected by the sensor 312. Alternatively, an existing controller or computer in the vehicle can collect the sensor data. The controller 318 can be programmed with one or more predetermined EOL parameter values such that when the sensor 312 detects that the EOL parameter has reached the predetermined value, a notification device 314 notifies the user that the fuel cell stack 310 has reached EOL. As a non-limiting example, if the EOL is defined by a predetermined number of hours of operation, the controller 318 is programmed such that when the sensor 312 detects the predetermined number of hours of operation, the notification device 314 notifies a user of the vehicle 300 that the fuel cell stack 310 has reached EOL and the recovery process should be performed.

The notification device 314 can be located in the vehicle passenger compartment, for example, on the dash board or instrument panel. The notification device 314 may also be on a key fob. The notification device 314 can be a visual indicator such as a light that turns on when EOL is reached or a light that changes color when EOL is reached. The visual indicator 314 can be instructions to run the recovery system. The notification device 314 may also or alternatively be an audio indicator. As a non-limiting example, an alarm such as a beep can sound when EOL if reached and can resound whenever the vehicle is started after EOL is reached. It is also contemplated that the notification device 314 can send a visual notification to an email address or send a text to the user providing instructions to run the recovery system.

The recovery process requires that the fuel cell stack 310 be placed under a steady-state load 316 for a period of time. The recovery system can be provided at a user's residence or can be accessible to a user at a dealer or mechanic's shop for example. The fuel cell stack 310 does not need to be removed from the vehicle 300. The fuel cell recovery process is done in situ and does not require a high level of mechanical skill The means for drawing the steady-state load 316 that may be provided at a user's residence can include one or more internal load drawing accessories of the vehicle 300 as indicated in FIG. 11. Internal load drawing accessories include, for example, vehicle lights, the HVAC system, and other on-board vehicle components. In this way, the recovery process is internal to the vehicle 300 as the process utilizes the fuel gas that is provided in the vehicle's fuel gas tank 320.

The means for drawing the steady-state load 316 can include hooking the fuel cell stack 310 up to a residential power grid, such as envisioned for electric vehicles. The fuel cell stack 310 will operate at steady-state using the on-board fuel gas in the fuel gas tank 320 and the power generated would be supplied to the power grid as opposed to operating the vehicle. Another means for drawing the steady-state load 316 can be an external load generator 322 as shown in FIG. 13, or a load box, that can be attached to the fuel cell stack 310. A load box 322 may be purchased and installed at a residence or may be used by a technician at a dealer or mechanic's shop. Another example of means for drawing the steady-state load 316 is a dynamometer 324, as shown in FIG. 12, a device typically found at dealers and mechanics. The vehicle 300 would be set up on the dynamometer 324 to operate at a steady pace for the required period of time. As mentioned herein, a steady-state load of about 0.3 to 0.5 $A/cm^2$ is recommended. The examples are not meant to be limiting. Other load generators known to those skilled in the art can be used.

It is contemplated that the vehicle's fuel gas tank 320 is sufficiently sized to provide the fuel gas required during the recovery process. However, an external fuel tank 330 can be provided to increase capacity or to be used in place of the on-board fuel tank 320. For example, if a vehicle 300 is taken into the dealer or a shop to have the recovery process completed with the dealer's or shop's system, it would eliminate the need to use the vehicle owner's fuel gas and enable accurate measuring of fuel gas usage during the process for quality and cost purposes. The external fuel gas supply 330 can be coupled to the on-board fuel tank 320 to continually supply the fuel cell via the on-board tank 320, as shown by line 332, or fuel gas can be supplied directly to the fuel cell stack 310 directly from the external fuel gas supply 330 through a bypass valve 334 that can be added to the existing power generation system of the vehicle 300, as shown with line 336.

The means for drawing a steady-state load 316 can be operated for a predetermined period of time. A timer can be used to alert the user or technician that the predetermined time period has elapsed. Alternatively, the timer can be configured to automatically stop the means for drawing a steady-state load 316 and end the recovery process when the predetermined time period has elapsed.

The sensor 312 that detects one or more EOL parameters can also be configured to detect a recovery state of the fuel cell stack 310 while the recovery process is undergoing. Alternatively, a second sensor can be incorporated into the system to detect the recovery state of the fuel cell stack 310. In either case, the sensor 312 can be configured to stop the means for drawing the steady-state load 316 when the recovery state is detected and/or indicate to the user or technician that the recovery state has been reached. The recovery state can be defined by a predetermined amount of time of operation of the means for drawing the steady-state load, an output voltage of the fuel cell and/or a current of the fuel cell. The recovery state is defined as at or near BOL of the fuel cells as described above.

One or more parameters of the fuel cell stack 310 can be monitored during the recovery process to determine the recovery state, and those parameters can be saved by the controller 318. It is contemplated that the data can be downloaded for use by the owner of the vehicle or the technician to track the progress of the recovery process to ensure the quality of the recovery.

The exhaust from the fuel cell stack 310 can be monitored during the recovery process to test for other contaminants or to determine how much carbon is being removed during the process. As a non-limiting example, a carbon dioxide detector can be placed on the exhaust of the fuel cell to monitor carbon dioxide exhausted from the fuel cell stack 310 during the recovery process. From the carbon dioxide data, the amount of carbon removed from the catalyst can be calculated. This carbon information can assist in determining the number of recovery cycles that can be performed on the fuel cell stack 310 until the catalyst is unable to be recovered properly. As another non-limiting example, a hydrogen sulfide monitor can be used to monitor the amount of contamination of the fuel cell catalyst and the amount of removal of the contamination. As an additional non-limiting example, an oxide monitor can be used to monitor the amount of oxides (oxygen containing groups of carboxyl, carbonyl, phenol, carbonyl, etc.) being exhausted.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for recovering catalyst performance of a fuel cell in a vehicle, the system comprising:
   a sensor located in the vehicle that detects a fuel cell parameter during use of the vehicle throughout a first life cycle of the fuel cell, during which cell potential is cycled due at least to vehicle starting and stopping;
   a fuel gas supply configured to supply fuel gas to an anode side of the fuel cell during a recovery process;
   an oxidant supply configured to supply oxidant to a cathode side of the fuel cell during the recovery process; and
   a recovery controller with a memory located in the vehicle and programmed to:
   determine an end of life state of the fuel cell in the vehicle based on a signal from the sensor and preprogrammed end of life criteria;
   notify with a notification device when the end of life state of the fuel cell is determined;
   control a continuous feed of the fuel gas supplied only to the anode side and a continuous feed of the oxidant supplied only to the cathode side;
   control continuous operation of the fuel cell in a steady-state by controlling a steady-state load generator to draw a steady current throughout the recovery process without cycling, thereby removing oxides from a catalyst surface to recover the catalyst performance of the fuel cell;
   determine a recovery state of the fuel cell based on a recovery parameter and preprogrammed recovery criteria, the recovery state indicating that the catalyst performance has been recovered; and
   allow operation of the fuel cell in the steady-state to cease when the recovery is detected.

2. The system of claim 1, wherein the fuel cell parameter is a number of hours of operation and the detected end of life state is a predetermined number of hours of operation.

3. The system of claim 1, wherein the fuel cell parameter is a number of miles driven and the detected end of life state is a predetermined number of miles driven.

4. The system of claim 1, wherein the fuel cell parameter is one or both of an outlet voltage of the fuel cell and a current drawn by the fuel cell and the detected end of life state is a predetermined iV value.

5. The system of claim 1, wherein the steady-state load generator comprises one or more internal load drawing accessories of the vehicle that draw the steady-state load while the vehicle is stationary.

6. The system of claim 1 further comprising:
a timer that automatically stops the steady-state load generator when a predetermined period has elapsed, the predetermined period determined as a period sufficient to recover the catalyst performance of the fuel cell.

7. The system of claim 1, wherein the recovery parameter is an amount of time of operation of the steady-state load generator.

8. The system of claim 1, wherein the recovery parameter is an output voltage of the fuel cell.

9. The system of claim 1, wherein the recovery state is at or near a beginning of life state of the fuel cell.

10. The system of claim 1, wherein the fuel gas supply is an external fuel gas supply that is external to the vehicle and that continually supplies external fuel gas to the fuel cell while the steady-state load generator is operating.

11. The system of claim 10, wherein the external fuel gas supply is connected to and continually supplies external fuel gas directly to the fuel cell via a bypass valve provided on the vehicle configured to route fuel gas from the external fuel gas supply to the fuel cell.

12. The system of claim 1, wherein the catalyst is a non-precious metal group catalyst.

13. The system of claim 12, wherein the non-precious metal group catalyst is a metal-nitrogen-carbon type catalyst.

14. The system of claim 1, wherein the steady current is between about 0.3 to 0.5 A/cm2.

15. A method of recovering catalyst performance of the system of claim 1, the method comprising:
detecting a performance parameter of a fuel cell with a sensor during use of the vehicle throughout normal operation of the vehicle, during which cell potential is cycled due at least to vehicle starting and stopping;
determining based on the detected performance parameter that the fuel cell is at or near an end of life state based on predetermined end of life criteria;
presenting a notification with a notification device when the performance parameter is at or near the end of life state of the fuel cell; and
recovering the catalyst performance of the fuel cell outside of the normal operation of the vehicle by:
controlling a continuous supply of fuel gas from a fuel gas supply to the anode side of the fuel cell;
controlling a continuous supply of oxidant from an oxidant supply to the cathode side of the fuel cell; and
drawing a steady current from the fuel cell continuously without cycling until a recovery state is detected, thereby removing oxides from a catalyst surface to recover the catalyst performance of the fuel cell.

16. The method of claim 15, wherein the performance parameter is one or more of current drawn, voltage outputted, hours of operation and distance traveled.

17. The method of claim 15, wherein drawing the steady current comprises operating one or more internal load drawing accessories of the vehicle while the vehicle is stationary.

18. The method of claim 15 further comprising:
detecting the recovery state of the fuel cell with the sensor, the recovery state indicating that the fuel cell is at or near the beginning of life state; and
stopping the drawing the steady current when the recovery state is detected by the sensor.

19. The method of claim 18, wherein detecting the recovery state comprises measuring one or more of an amount of time of drawing the steady current or the amount of voltage output from the fuel cell.

20. The method of claim 15, wherein the fuel gas supply is an external fuel gas supply that supplies external fuel gas to the fuel cell while drawing the steady-state load.

21. The method of claim 20, wherein the external fuel gas is supplied to one of a fuel gas tank or a bypass valve on the fuel cell.

22. The system of claim 8, wherein the recovery state is reached when the output voltage of the fuel cell reaches a steady state.

23. The system of claim 6, wherein the predetermined period of time is between 15 and 20 hours at ambient pressure.

* * * * *